(12) United States Patent
Hayakawa

(10) Patent No.: US 7,657,431 B2
(45) Date of Patent: Feb. 2, 2010

(54) VOICE AUTHENTICATION SYSTEM

(75) Inventor: Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 11/889,996

(22) Filed: Aug. 17, 2007

(65) Prior Publication Data

US 2008/0172230 A1 Jul. 17, 2008

Related U.S. Application Data

(63) Continuation of application No. PCT/JP2005/002589, filed on Feb. 18, 2005.

(51) Int. Cl.
*G10L 15/00* (2006.01)
(52) U.S. Cl. .................. 704/246; 704/235; 704/251
(58) Field of Classification Search .................. 704/246, 704/235, 251
See application file for complete search history.

(56) References Cited

U.S. PATENT DOCUMENTS

| 6,480,825 | B1 | 11/2002 | Sharma et al. |
| 6,760,701 | B2 * | 7/2004 | Sharma et al. ............. 704/249 |
| 7,386,448 | B1 * | 6/2008 | Poss et al. .................. 704/247 |
| 2002/0152070 | A1 | 10/2002 | Oda |
| 2003/0009333 | A1 * | 1/2003 | Sharma et al. ............. 704/246 |

FOREIGN PATENT DOCUMENTS

| JP | 59-191645 | 10/1984 |
| JP | 63-207262 | 8/1988 |
| JP | 63-231496 | 9/1988 |
| JP | 10-056449 | 2/1998 |
| JP | 2000-148187 | 5/2000 |
| JP | 2000-181490 | 6/2000 |
| JP | 2001-109494 | 4/2001 |

(Continued)

OTHER PUBLICATIONS

International Search Report issued in PCT/JP2005/002589 on Jun. 5, 2005.

*Primary Examiner*—Daniel D Abebe
(74) *Attorney, Agent, or Firm*—Staas & Halsey LLP

(57) ABSTRACT

A text-dependent voice authentication system that performs authentication by urging a user to input a keyword by voice includes: an input part (11) that receives a voice input of a keyword divided into a plurality of portions with an utterable unit being a minimum unit over a plurality of times at a time interval for each of the portions; registered speaker-specific syllable model DB (20) that previously stores a registered keyword of a user as a speaker model created in the utterable unit; a feature value conversion part (12) that obtains a feature value of a voice contained in a portion of the keyword received by each voice input in the input part (11) from the portion; a similarity calculation part (13) that obtains a similarity between the feature value and the speaker model; a keyword checking part (17) that determines whether or not voice inputs of all the syllables or phonemes configuring an entire registered keyword by the plurality of times of voice inputs, based on the similarity obtained in the similarity calculation part; and an authentication determination part (19) that determines whether to accept or reject authentication, based on a determination result in the keyword checking part and the similarity obtained in the similarity calculation part.

10 Claims, 9 Drawing Sheets

FOREIGN PATENT DOCUMENTS

| | | |
|---|---|---|
| JP | 2002-514318 | 5/2002 |
| JP | 2002-311992 | 10/2002 |
| JP | 2002-312318 | 10/2002 |
| JP | 2004-118456 | 4/2004 |
| JP | 2004-279770 | 10/2004 |
| JP | 2004-294755 | 10/2004 |
| JP | 2004-334377 | 11/2004 |

* cited by examiner

FIG. 2

Store in a similarity storage part
→ I1
→ I2
→ I3
→ I4

|  | I1(「KA」) | I2(「RA」) | I3(「O」) | I4(「KE」) |
|---|---|---|---|---|
| S1(「KA」) | $C_{S1:I1}$ | $C_{S1:I2}$ | $C_{S1:I3}$ | $C_{S1:I4}$ |
| S2(「RA」) | $C_{S2:I1}$ | $C_{S2:I2}$ | $C_{S2:I3}$ | $C_{S2:I4}$ |
| S3(「O」) | $C_{S3:I1}$ | $C_{S3:I2}$ | $C_{S3:I3}$ | $C_{S3:I4}$ |
| S4(「KE」) | $C_{S4:I1}$ | $C_{S4:I2}$ | $C_{S4:I3}$ | $C_{S4:I4}$ |

VOICE AUTHENTICATION SYSTEM

CROSS-REFERENCE TO RELATED APPLICATIONS

This application is a continuation of PCT International Application No. PCT/JP2005/002589 which has an International filing date of Feb. 18, 2005 and designated the United States of America.

TECHNICAL FIELD

The present invention relates to a voice authentication system for performing personal identification using a voice, and in particular, to a text-dependent voice authentication system.

BACKGROUND ART

Conventionally, as one means for personal identification of a system user, voice authentication has been put into practical use. Recently, fingerprint authentication that is one biometrics authentication is often used for personal authentication in electronic commerce or the like in a mobile environment. However, a special sensor is separately required for fingerprint authentication. In the case of performing personal authentication using a voice, for example, in a mobile telephone, a microphone that is a sensor has already been provided, so that a mobile terminal is expected to be applied to voice authentication in a mobile environment.

The voice authentication is roughly classified into two kinds: a text-dependent type and a text-free type. According to the text-dependent type, a user is previously urged to read out a keyword (password) or a phrase to register a voice thereof, and at a time of authentication, the user is urged to utter the same keyword or phrase as that at a time of registration, whereby authentication is performed. According to the text-free type, authentication is performed only with characteristics of speaker irrespective of speech content. Thus, in the case of the text-free type, it is not necessary to determine a keyword or the like, so that the user can perform registration and authentication with arbitrary speech content. The present invention relates to the former text-dependent voice authentication.

In the text-dependent voice authentication, authentication processing is performed based on both the characteristics of speaker and the confidential information on a speech content (keyword, etc.), so that relatively high authentication accuracy is obtained. However, in an environment in which another person is present nearby at a time of authentication, there is a possibility that he/she may hear a secret keyword. Therefore, due to the reluctance of a user, it is difficult to adopt text-dependent voice authentication for the application (e.g., personal identification at a time of payment with a mobile telephone containing a payment function at a cash desk of a shop, an automatic vending machine, etc.) in which authentication is performed in an environment with no privacy.

Furthermore, in the case where a keyword is revealed, the confidentiality of speech content cannot be used for authentication, so that authentication accuracy is degraded. There is also a possibility that another person may record a secret keyword uttered by a user with a tape recorder or an IC recorder without proper authorization, and reproduce the keyword at a time of authentication, thereby succeeding in fraud (recording and reproduction fraud).

In order to solve these problems, for the purpose of preventing recording and reproduction fraud, a method for detecting that a voice has been reproduced from a loudspeaker based on phase difference information of the voice (see Patent Document 1), a method for detecting recording and reproduction by comparing transmission characteristics and superimposing a DTMF signal on a voice to insert a voice watermark (see Patent Document 2), etc. are proposed. There is also a system for preventing recording and reproduction fraud by urging a user to utter a text with a content varying for each authentication (see Patent Document 3).

Furthermore, there is proposed a method for preventing fraud even if a password is revealed, by registering a plurality of kinds of passwords so as to associate them with indexes, and urging a user to input an index corresponding to a password together with the password at a time of authentication (Patent Document 4). As means for preventing an identification number used for voice authentication from being revealed to the surrounding, there is also proposed a method for preventing the leakage of an identification number by displaying a screen on which a color is allocated to each number, and urging a user to utter the name of a color at a time of authentication (Patent Document 5).

There is also a method for previously preparing a number of kinds of input orders of numerical digits and urging a user to designate and input one kind among them at a time of authentication in a system for performing authentication of an operator with a voice input of a plurality of numerical digits (Patent Document 6). Furthermore, there is also a system for preventing the leakage of a secret password by instructing a user to utter a secret symbol string in a deformed manner (Patent Document 7). A voice response recognition apparatus is also known, which prevents the leakage of an identification number by instructing a user to insert dummy numbers in an identification number to be input by voice at random (Patent Document 8).

Patent Document 1: JP 2001-109494 A
Patent Document 2: JP 2002-514318 A
Patent Document 3: JP 2000-148187 A
Patent Document 4: JP 2000-181490 A
Patent Document 5: JP 2002-311992 A
Patent Document 6: JP 59(1984)-191645 A
Patent Document 7: JP 63(1988)-231496 A
Patent Document 8: JP 63(1988)-207262 A However, even if the recording and reproduction fraud countermeasures as described in the above-mentioned Patent Documents 1-3 are taken, a password has already been revealed at a time of being recorded, so that authentication accuracy is degraded. Furthermore, in order to prevent the leakage of a password or conceal the password, as in the methods described in the above-mentioned Patent Documents 4-8, an alteration of speech content and a special operation are required, which makes it difficult for a user to use the methods. Furthermore, in the case of designating a speech content for each authentication, confidential information on a speech content (what has been uttered) cannot be used for authentication, so that there is a problem that high accuracy cannot be obtained.

DISCLOSURE OF INVENTION

In view of the above problems, it is an object of the present invention to provide a voice authentication system capable of maintaining high authentication accuracy, using the confidentiality of a keyword, by preventing the leakage of a keyword and recording fraud in a text-dependent voice authentication system.

In order to achieve the above-mentioned object, a voice authentication system according to the present invention is A text-dependent voice authentication system that performs authentication by receiving a keyword which a user inputs by voice, includes: an input part that receives a voice input of a keyword from the user, said keyword is divided into a plurality of portions with an utterable unit which is a minimum unit, said voice input is carried out over a plurality of times at a time interval for each of the portions; a speaker model storage part that previously stores a registered keyword of the user as a speaker model created in the utterable unit; a feature value conversion part that obtains a feature value of a voice from a portion of the keyword which is received by each voice input in the input part; a similarity calculation part that obtains a similarity between the feature value obtained in the feature value conversion part and the speaker model; a speech content determination part that determines information on a speech content by the plurality of times of voice inputs, based on the similarity obtained in the similarity calculation part; a keyword checking part that determines whether or not the speech content of the plurality of times of voice inputs is capable of configuring an entire registered keyword, based on the information on the speech content determined in the speech content determination part; and an authentication determination part that determines whether to accept or reject authentication, based on a determination result in the keyword checking part and the similarity obtained in the similarity calculation part.

According to the above configuration, a keyword is input by voice under the condition of being divided into a plurality of portions with an utterable unit being a minimum unit, whereby the entire keyword can be prevented from being revealed at a time of authentication in an environment in which others are present in the surrounding. Furthermore, the entire keyword is not uttered continuously at a time, so that the entire keyword can be prevented from being recorded, which can also prevent recording fraud. Furthermore, a text-dependent voice authentication system with high accuracy can be provided by determining whether or not voice inputs of all the syllables or phoneme configuring an entire registered keyword by a plurality of times of voice inputs in the keyword checking part, and it is determined whether to accept or reject authentication based on the determination result and the similarity obtained in the similarity calculation part.

In the voice authentication system according to the present invention, an example of the utterable unit is a syllable. In this case, it is preferable that in the speaker model storage part, a discrete index in the speaker model storage part is provided to each speaker model corresponding to each syllable configuring the registered keyword, the feature value conversion part obtains each feature value for each syllable from each portion of the keyword received by each voice input, the similarity calculation part obtains each similarity between each feature value for each syllable and the speaker model corresponding to each syllable, the system further comprises a syllable determination part that determines to which syllable of the registered keyword any of the portions of the keyword received by the voice inputs is the most similar, based on the similarity obtained in the similarity calculation part, and the keyword checking part determines whether or not the syllables determined by the plurality of times of voice inputs are capable of configuring the entire registered keyword, based on a determination result of the syllable determination part. According to this configuration, whether or not the speech content of a keyword input by voice at a time of authentication is matched with the speech content of a registered keyword even without speech recognition, so that it is not necessary to have a grammar dictionary for speech recognition, etc., whereby a system configuration can be simplified.

In the voice authentication system according to the present invention, another example of the utterable unit is a reading of a numeric or a reading of an alphabet. According to the above configuration, the voice authentication system of the present invention is adaptable for a keyword composed of numerics or alphabets, or a combination thereof.

It is preferable that the voice authentication system according to the present invention further includes a speech recognition part that recognizes a syllable or phoneme of the portion of the keyword using a speaker independent speech recognition method, from the feature value obtained in the feature value conversion part, wherein the keyword confirmation part determines whether or not it is possible to configure the entire registered keyword using a result of speech recognition by the plurality of times of voice inputs in the speech recognition part. Whether or not the speech content of a keyword at a time of authentication is matched with the speech content of the registered keyword is determined by speech recognition, whereby voice authentication with high accuracy can be performed.

In the voice authentication system according to the present invention, it is preferable that, the authentication determination part rejects authentication in a case where both there is no voice input of a subsequent portion even after an elapse of a predetermined time from a completion of the voice input of the portion of the keyword and it is not possible to configure the entire registered keyword, using information on the speech content of the voice inputs up to that time. This is because security can be enhanced.

It is preferable that the voice authentication system according to the present invention further includes: a positional information acquiring part that acquires location information of the user every time the portion of the keyword is input by voice; and a position checking part that compares location information acquired in the positional information acquiring part at a time of a previous voice input with location information acquired in the positional information acquiring part at a time of a current voice input and checks whether or not the user has moved by a predetermined distance or longer from the previous voice input to the current voice input using a result of the comparison. The reason for this is as follows: if the user moves to another place every time a voice is input when the voice is input under the condition of being divided, the possibility that the entire password is known by others in the surrounding is lowered further, whereby security can be enhanced.

Furthermore, it is preferable that the voice authentication system according to the present invention further includes a similarity integration part that obtains an integrated similarity by integrating similarities obtained in the similarity calculation part, regarding all the portions of the keyword received by the plurality of times of voice inputs, wherein the authentication determination part determines whether to accept or reject authentication on the basis of the integrated similarity obtained in the similarity integration part. The reason for this is as follows: if determination is performed by integrating similarities regarding the entire keyword, an utterance length becomes large, so that determination can be performed based on stable similarities.

Furthermore, in the voice authentication system according to the present invention, it is preferable that the input part receives a voice input through a mobile terminal of the user. According to this configuration, second and subsequent voice inputs can be performed at a place away from a place where an initial voice input is performed, so that the possibility that the entire keyword is being revealed to others can be lowered.

In order to achieve the above-mentioned object, a computer program according to the present invention embodies a text-dependent voice authentication system that performs authentication by receiving a keyword which a user to input a keyword by voice. The computer program controls a computer to execute the operations includes: an input operation of receiving a voice input of a keyword from the user, said keyword is divided into a plurality of portions with an utterable unit which is a minimum unit, said voice input is carried out over a plurality of times at a time interval for each of the portions; a feature value conversion operation of obtaining a feature value of from a portion of the keyword which is received by each voice input in the input part, said feature value of a voice is a speech signal contained in the portion of the keyword; a similarity calculation operation of referring to a speaker model storage part in which a keyword of a user is previously registered as a speaker model created in the utterable unit, and obtaining a similarity between the feature value obtained in the feature value conversion operation and the speaker model; a speech content determination operation of determining information on a speech content by the plurality of times of voice inputs, based on the similarity obtained in the similarity calculation part; a keyword checking operation of determining whether or not the speech content of the plurality of times of voice inputs is capable of configuring an entire registered keyword, based on the information on the speech content determined in the speech content determination operation; and an authentication determination operation of determining whether to accept or reject authentication, based on a determination result by the keyword checking operation and the similarity obtained by the similarity calculation operation.

Furthermore, a recording medium storing the above-mentioned computer program is also one aspect of the present invention.

BRIEF DESCRIPTION OF DRAWINGS

FIG. 2 is a diagram illustrating a method for determining the correctness of a keyword based on the similarity between a syllable of a keyword input at a time of authentication and a syllable of a registered keyword in the voice authentication system.

DESCRIPTION OF THE INVENTION

Embodiment 1

One embodiment of the voice authentication system according to the present invention will be described below.

In the voice authentication system according to the present embodiment, a user to be authenticated inputs a previously registered secret keyword (password) by voice from a mobile telephone or a mobile terminal, thereby being authenticated. In the voice authentication system, at a time of authentication, the user divides all the syllables configuring an entire keyword into portions composed of one syllable or a plurality of syllables, and inputs the divided keywords by voice over a plurality of times at time intervals, more preferably, in different places. The input order of the divided keywords may be the order of the keyword or may be at random. At a time of authentication, it is necessary to utter all the syllables configuring the entire keyword by a plurality of voice inputs.

For example, in the case where a keyword is a "KARAOKE", a user divides the keyword into "KARA" and "OKE", for example, and after the elapse of several seconds to several minutes from the voice input of the first divided keyword (for example, "KARA"), inputs the second divided keyword (for example, "OKE"). In order to prevent another person present nearby from hearing the keyword, it is preferable that the user moves to another place between the first voice input and the second voice input.

Regarding the division of the keyword, the order of syllables may be at random (e.g., "KAO" and "RAKE", "KEKA" and "ORA", "RAKA" and "KEO"). Furthermore, there may be a divided keyword composed of a single syllable as in "KA" and "KEORA". Furthermore, the division number is not limited two.

In the voice authentication system of the present embodiment, voice authentication is performed based on a keyword uttered under a condition of being divided as such. Consequently, even if a keyword is uttered in an environment in which another person is present nearby, he/she hears only a part of the keyword in the first utterance, so that he/she is prevented from knowing the entire keyword.

In the voice authentication system according to the present embodiment, voice authentication is performed under a condition that a keyword is divided into divided keywords composed of one syllable or a plurality of syllables. Therefore, the voice authentication system according to the present embodiment is suitable for voice authentication in a language (e.g., Japanese) in which a word is easily partitioned on a syllable basis.

Figure 1:
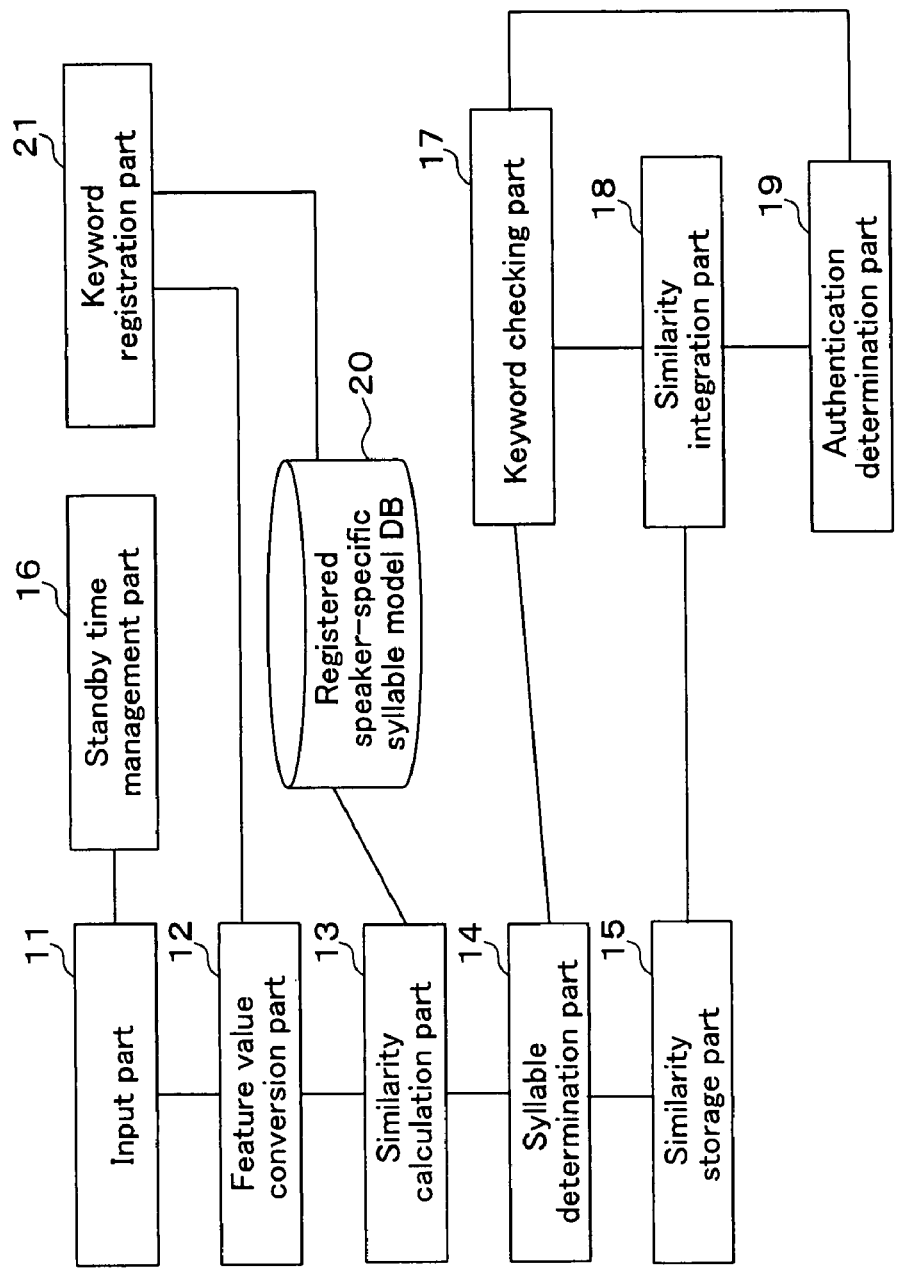
FIG. 1 is a block diagram showing a schematic configuration of a voice authentication system according to Embodiment 1 of the present invention.

As shown in FIG. 1, the voice authentication system according to the present embodiment includes an input part 11, a feature value conversion part 12, a similarity calculation part 13, a syllable determination part 14, a similarity storage part 15, a standby time management part 16, a keyword checking part 17, a similarity integration part 18, an authentication determination part 19, a registered speaker-specific syllable model database 20, and a keyword registration part 21.

The input part 11 inputs a user ID and a voice of a user to be authenticated from a mobile telephone or a mobile terminal of the user. In the case where the number of users is limited to one as in a mobile telephone, the input procedure of the user ID is not necessary. The feature value conversion part 12 converts the input voice into feature values used for comparison with speaker-specific syllable models.

The syllable determination part 14 compares the feature values obtained in the feature value conversion part 12 with the speaker-specific syllable models previously registered by the user in the registered speaker-specific syllable model database 20 to obtain similarities, and determines which speaker-specific syllable model each syllable of the input voice is most similar to, based on the obtained similarities. The similarity storage part 15 holds the similarity to the speaker-specific syllable model obtained in the syllable determination part 14, regarding each syllable of the input voice.

The standby time management part 16 monitors time intervals of utterances at which a keyword is uttered over a plurality of times. The keyword checking part 17 confirms whether or not all the syllables of the keyword have been uttered by a plurality of utterances, based on the recognition results of the syllables by the syllable determination part 14. The similarity integration part 18 obtains an integrated similarity that represents to which degree the keyword voice uttered at a time of authentication is similar to the registered keyword voice as a whole, based on the similarity for each syllable stored in the similarity storage part 15. The authentication determination part 19 determines whether to accept or reject the authentication of the user, based on the integrated similarity obtained in the similarity integration part 18.

The keyword registration part 21 creates syllable models from a keyword input by voice to the input part 11 by the user when the user of the voice authentication system registers a keyword.

The above-mentioned voice authentication system can be realized by a computer and peripheral equipment thereof. In this case, the similarity storage part 15 and the registered speaker-specific syllable model database 20 can be realized by a storage apparatus in the computer or accessible from the computer. The input part 11, the feature value conversion part 12, the similarity calculation part 13, the syllable determination part 14, the standby time management part 16, the keyword checking part 17, the similarity integration part 18, the authentication determination part 19, and the keyword registration part 21 can be realized by executing a program that causes a processor of the above-mentioned computer to embody the function of each part. Thus, such a program or a computer-readable recording medium that records such a program are also included in one embodiment of the present invention.

Herein, a procedure of voice authentication in the voice authentication system of the present embodiment according to the above configuration will be described.

First, a procedure at a time when a user registers a keyword in the registered speaker-specific syllable model database 20 of the voice authentication system will be described. The user determines a desired keyword, and utters the keyword toward a microphone of a mobile telephone or the like connected to the input part 11. At this time, the user utters the keyword by one syllable with the keyword partitioned with voiceless sections. For example, in the case where the keyword is "KARAOKE", the keyword includes four syllables "KA", "RA", "O" and "KE", so that the user utters these four syllables by inserting voiceless sections. The input part 11 passes the input syllable utterance to the feature value conversion part 12. In the feature value conversion part 12, an input voice wave is converted into feature vector streams with a voice feature extracted, such as an MFCC (Mel Frequency Cepstral Coefficients) or an LPC cepstrum. After that, the input part 11 passes the feature vector streams successively to the keyword registration part 21.

The keyword registration part 21 allocates an index to each of the input syllables in an input order. More specifically, in the above example, an index I1 is allocated to "KA (first syllable)", an index I2 is allocated to "RA (second syllable)", an index I3 is allocated to "O (third syllable)", and an index I4 is allocated to "KE (fourth syllable)". It is sufficient for the keyword registration part 21 to allocate indexes in an order in which the syllables have been input, and it is not necessary for the keyword registration part 21 to recognize what the content of each syllable is. As described later, there may be a case in which whether or not a syllable with the same content is contained in a keyword is checked at this time.

The keyword registration part 21 creates a speaker syllable model from each syllable with an index thus allocated thereto, and registers the speaker syllable model and the allocated index in the registered speaker-specific syllable model database 20 under the condition that the speaker syllable model is associated with a user ID of the user. The speaker-specific syllable model can be created, for example, by adapting an speaker independent GMM (Gaussian Mixture Model) to a specified speaker by MAP (Maximum A Posteriori) adaptation, and carrying out the adaptation for each syllable. The speaker syllable model is not limited to the GMM, and any procedure such as an HMM (Hidden Markov Model) can be applied as long as a speaker model can be created for each index. A speaker-specific syllable model can also be created by storing a registered feature vector stream as it is as a template without adaptation.

In order to enhance the authentication accuracy, it is desirable that the user is urged to utter a keyword as many times as possible (at least three times). In this case, a speaker-specific syllable model is adapted, using a feature vector stream of a repetition number (for example, three in the case where the keyword is uttered repeatedly three times) for each syllable, and registered in the registered speaker-specific syllable model database 20. In the case of a speaker-specific syllable model that is stored as the above-mentioned template, a speaker-specific syllable model having a template of a repetition number is registered in the registered speaker-specific syllable model database 20.

Figure 3:
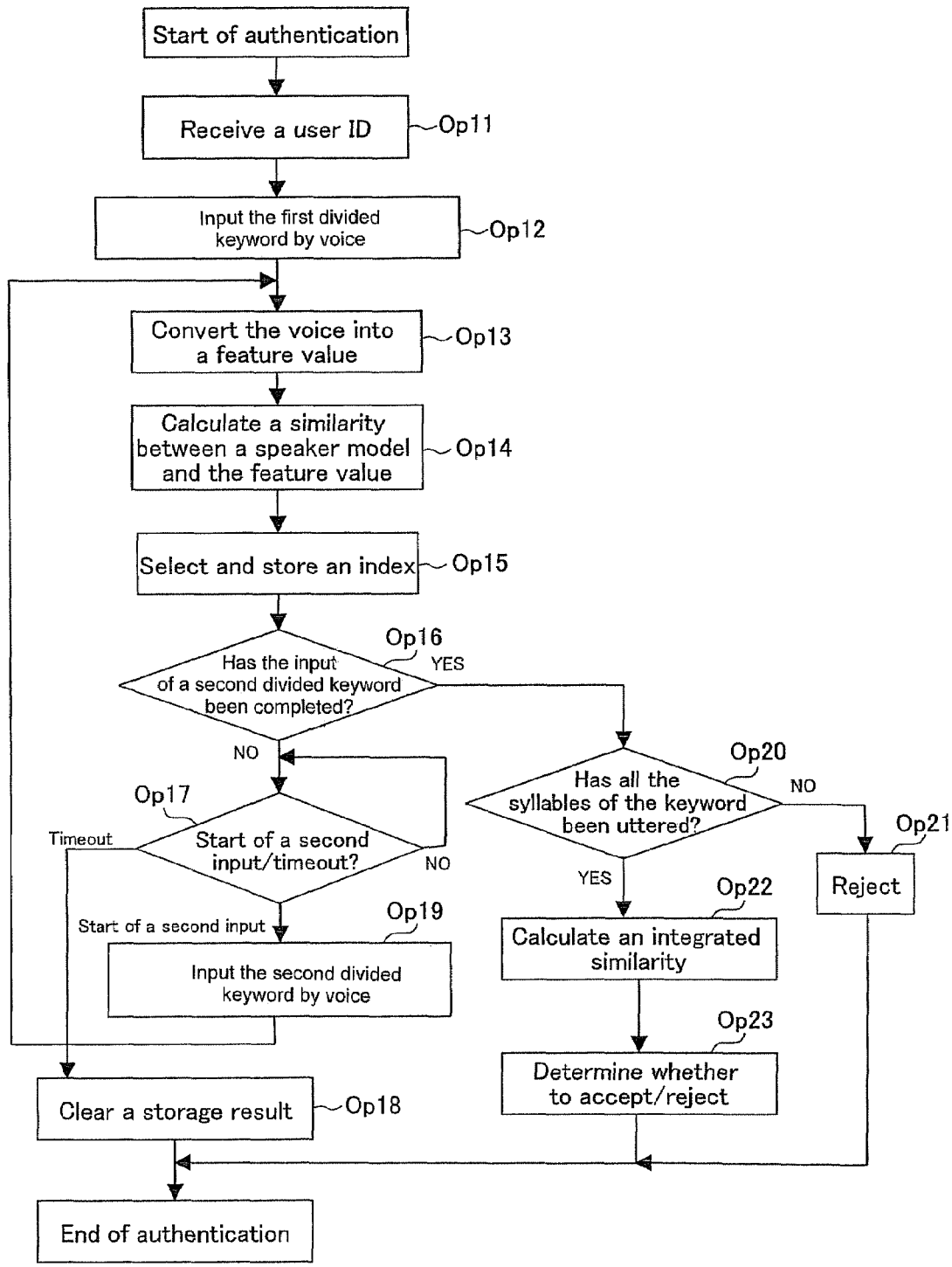
FIG. 3 is a flowchart showing an operation of the voice authentication system according to Embodiment 1 of the present invention.

Next, a procedure will be described in the case where a user registers a keyword "KARAOKE" in the above order, and then, is authenticated, with reference to the flowchart of FIG. 3. Herein, an example is shown in which the user performs a voice input from a mobile telephone, and utters a keyword by dividing the keyword into two portions. However, the division number of the keyword is not limited to two. Furthermore, the input means of the keyword is not limited to a mobile telephone.

In the case where there is an authentication start button in a mobile telephone, when the button is pressed, an application required to be authenticated is activated, or there is a request for authentication in the course of execution of another application, the authentication processing is started.

First, the input part 11 receives a user ID or the like input by a user through a keypad of a mobile telephone (Op11). In the case where the number of users is limited to one as in a mobile telephone, the input procedure of the user ID is not required. Next, when the user utters the first divided keyword toward a microphone of the mobile telephone, the input part 11 receives the voice (Op12). Herein, it is assumed that the user divides the keyword into "KARA" and "OKE", and inputs them by voice. The user inputs "KA" and "RA" by voice as the first divided keyword by partitioning them by one syllable with a voiceless section. Hereinafter, the respective syllables "KA" and "RA" thus input by voice are represented as S1 and S2 in accordance with the input order.

Whether or not the input of the first divided keyword has been completed can be determined based on whether or not a voiceless section continues for a predetermined period of time or longer. Alternatively, when the input of the divided keyword has been completed, the user may be allowed to perform a predetermined key operation.

In the feature value conversion part 12, the respective input syllables S1 and S2 are converted into feature vector streams (feature values) used for the comparison with the speaker syllable models, such as an MFCC and an LPC cepstrum by the same analysis method as that at a time of registration (Op13). The feature value obtained in the feature value conversion part 12 is sent to the similarity calculation part 13.

Next, the similarity calculation part 13 extracts speaker syllable models (i.e., speaker syllable models of the above-mentioned indexes 11 to 14) of the user stored so as to be associated with the user ID of the user, from the registered speaker-specific syllable model database 20, and calculates similarities of the feature values with respect to the extracted speaker syllable models (Op14). Herein, it is assumed that the similarity of the syllable S1 with respect to the speaker syllable model of the index I1 is represented as $C_{S1:I1}$. More specifically, in Op14, for example, regarding the syllable S1, four values $C_{S1:I1}$, $C_{S1:I2}$, $C_{S1:I3}$, and $C_{S1:I4}$ are obtained as similarities, and regarding the syllable S2, four values $C_{S2:I1}$, $C_{S2:I2}$, $C_{S2:I3}$, and $C_{S2:I4}$ are obtained as similarities. The obtained similarities are sent to the syllable determination part 14.

In the case where speaker-specific syllable templates of a plurality of times are registered regarding the same syllable, as in the case where a keyword is uttered repeatedly when syllable models are registered as templates, similarities are calculated for all the speaker-specific syllable templates. Thus, in the case where "KA", "RA", "O", and "KE" are uttered repeatedly three times to register templates as speaker syllable models at a time of registration of a keyword, if the indexes of the speaker syllable models are allocated as in $I1_{(1)}, I1_{(2)}, I1_{(3)} \ldots$, 12 values: $C_{S1:I1(1)}, C_{S1:I1(2)}, C_{S1:I1(3)}, C_{S1:I2(1)}, C_{S1:I2(2)}, C_{S1:I2(3)} \ldots$ are obtained as similarities regarding the syllable S1, for example, in Op14.

Next, the syllable determination part 14 selects an index of a model having the highest similarity among the speaker syllable models stored in the registered speaker-specific syllable model database 20 regarding the respective syllables S1 and S2, based on the similarities obtained in the similarity calculation part 13 (Op 15).

For example, the user has uttered "KA" as the syllable S1. Therefore, among the similarities $C_{S1:I1}$, $C_{S1:I2}$, $C_{S1:I3}$, and $C_{S1:I4}$ regarding the syllable S1, the similarity $C_{S1:I1}$ with respect to the speaker syllable model of the index I1 (syllable "KA" at a time of registration) is a maximum value. Thus, as shown in FIG. 2, the syllable determination part 14 determines that the uttered syllable S1 corresponds to the speaker syllable model of the index I1, and stores "I1" in the similarity storage part 15 as the index data on the uttered syllable. Furthermore, together with this, $C_{S1:I1}$ having the highest similarity regarding the syllable S1 is stored in the similarity storage part 15 as the similarity (syllable similarity) of the syllable S1.

In the same way as the above, regarding the syllable S2, an index of a model with the highest similarity among the speaker syllable models is selected. Herein, the user has uttered "RA" as the syllable S2. Therefore, among the similarities $C_{S2:I1}$, $C_{S2:I2}$, $C_{S2:I3}$, and $C_{S2:I4}$ regarding the syllable S2, the similarity $C_{S2:I2}$ with respect to the speaker syllable model of the index I2 (syllable "RA" at a time of registration) is the highest value. Consequently, as shown in FIG. 2, the syllable determination part 14 determines that the syllable S2 corresponds to the index I2, and stores "I2" in the similarity storage part 15 as index data on the uttered syllable. Together with this, $C_{S2:I2}$ having the highest similarity regarding the syllable S2 is also stored in the similarity storage part 15 as a syllable similarity of the syllable S2.

Herein, since the input of a second divided keyword has not been input (the result in Op16 is NO), the process proceeds to Op17.

The standby time management part 16 measures an elapsed time after the first divided keyword ("KARA") has been input to the input part 11 with a timer (not shown). Then, in the case where the input of the second divided keyword is not started within a predetermined time (e.g., 10 minutes), a timeout is determined, and the process proceeds to Op18. Then, the processing result of the first divided keyword is deleted from the similarity storage part 15 and the like (Op18). In this case, the user must re-input the first divided keyword in order to be authenticated.

In order to exactly prevent the keyword from being revealed to a third party, the voice input of the second divided keyword may not be accepted unless a predetermined time (e.g., 2 minutes) has elapsed from the voice input of the first divided keyword. In this case, it is preferable to display a message instructing the user to wait for a predetermined time before the voice input of the second divided keyword, when the input of the first divided keyword is completed, in a display of a mobile telephone or the like of the user, and to send a voice message containing the similar content to the mobile telephone.

On the other hand, in Op17, in the case where the input of the second divided keyword is started within the above-mentioned predetermined time, the standby time management part 16 stops and clears the timer, proceeds to Op19, receives the input of the second divided keyword (Op19), and then, proceeds to Op13.

In this example, the user utters "O" and "KE" as the second divided keyword by partitioning them by one syllable. Hereinafter, it is assumed that the respective syllables "O" and "KE" thus input by voice are represented as S3 and S4 in accordance with an input order.

The respective input syllables S3 and S4 are converted into feature values in the feature value conversion part 12 (Op13). Next, the similarity calculation part 13 extracts speaker syllable models (i.e., the speaker syllable models of the indexes I1 to I4) stored so as to be associated with the user ID of the user from the registered speaker-specific syllable model database 20, and calculates similarities of the feature values with respect to the extracted speaker syllable models (Op14).

Consequently, similarities $C_{S3:I1}$, $C_{S3:I2}$, $C_{S3:I3}$, $C_{S3:I4}$, $C_{S4:I1}$, $C_{S4:I2}$, $C_{S4:I3}$, and $C_{S4:I4}$ to the features values obtained in the feature value conversion part 12 regarding the syllables S3 and S4 are calculated with respect to the respective speaker syllable models of the indexes I1 to I4.

In the case where speaker syllable models of a plurality of times are registered with respect to the same syllable by allowing a keyword to be uttered repeatedly at a time of registration of the keyword, similarities are calculated with respect to all the speaker syllable models thereof. Thus, in the case where "KA", "RA", "O", and "KE" are uttered repeatedly three times to register speaker syllable models at a time of registration of a keyword, if indexes of the speaker syllable models are allocated as $I1_{(1)}, I1_{(2)}, I1_{(3)} \ldots$, 12 values $C_{S3:I1(1)}, C_{S3:I1(2)}, C_{S3:I1(3)}, C_{S3:I2(1)}, C_{S3:I2(2)}, C_{S3:I2(3)} \ldots$ are obtained as similarities regarding the syllable S3, for example.

Next, the syllable determination part 14 selects an index of a model having the highest similarity among the speaker syllable models stored in the registered speaker-specific syllable model database 20 regarding the respective syllables S3 and S4, based on the similarities obtained in the similarity calculation part 13 (Op 15).

In this example, the user has uttered "O" as the syllable S3, so that $C_{S3:I3}$ is a maximum value among the similarities $C_{S3:I1}$, $C_{3:I2}$, $C_{S3:I3}$, and $C_{S3:I4}$ regarding the syllable S3. Thus, the syllable determination part 14 determines that the syllable S3 corresponds to the index I3, and stores "I3" in the similarity storage part 15 as the index data on the uttered syllable. Furthermore, together with this, $C_{S3:I3}$ that is a maximum value of the similarities regarding the syllable S3 is also stored in the similarity storage part 15 as the syllable similarity of the syllable S3.

In the same way as in the above, regarding the syllable S4, an index of a model with the highest similarity among the speaker syllable models is selected. Herein, the user has uttered "KE" as the syllable S4, so that $C_{S4:I4}$ among the similarities $C_{S4:I1}$, $C_{S4:I2}$, $C_{S4:I3}$, and $C_{4:I4}$ regarding the syllable S4 is a maximum value. Thus, the syllable determination part 14 determines that the syllable S4 corresponds to the index I4, and stores "I4" in the similarity storage part 15 as the index data on the uttered syllable. Together with this, $C_{S4:I4}$ that is a maximum value of the similarities regarding the syllable S4 is also stored in the similarity storage part 15 as the syllable similarity of the syllable S3.

As described above, when the processing of the second divided keyword is completed (YES in Op16), the keyword checking part 17 checks whether or not all the syllables of a keyword have been uttered in the first and second utterances, based on the index data on the uttered syllables stored in the similarity storage part 15 (Op20). In the case of the above example, in the similarity storage part 15, "I1", "I2", "I3", and "I4" are stored as the index data on the uttered syllables. More specifically, all the indexes (I1 to I4) of the registered keyword are present, so that the keyword checking part 17 can confirm that all the syllables of the keyword have been uttered. In the case where the determination result in Op20 is NO, the authentication determination part 19 is notified of the determination result, and the authentication determination part 19 rejects the authentication of the user (Op21).

For example, in the above example, in the case where "KA" and "RA" are uttered as the first divided keyword, and "KA" and "KE" as the second divided keyword, since "O" has not been uttered, there is no index I3 of "O" in the index data on the uttered syllables. Therefore, authentication is rejected.

On the other hand, in the case where the determination result in Op20 is YES, the similarity integration part 18 calculates an integrated similarity representing to which degree the uttered entire keyword is similar to the registered keyword, based on respective syllable similarities ($Cs_{1:I1}$, $C_{S2:I2}$, $C_{S3:I3}$, $C_{S4:I4}$) of the syllables S1 to S4 stored in the similarity storage part 15 (Op22). As an integrated similarity, a total of syllable similarities of the respective syllables (i.e., $C_{S1:I1}$+$C_{S2:I2}$+$C_{S3:I3}$+$C_{S4:I4}$ in this example) may be used, or an average value of the syllable similarities of the respective syllables may be used. Alternatively, a total of the syllable similarities of the respective syllables averaged by a time length such as a frame number may be used as an integrated similarity.

The integrated similarity thus obtained in the similarity integration part 18 is sent to the authentication determination part 19, and the authentication determination part 19 compares a predetermined threshold value with an integrated similarity. The authentication determination part 19 accepts authentication of the user if the integrated similarity exceeds a predetermined threshold value, and rejects the authentication of the user if the integrated similarity is below the predetermined threshold value (Op23).

In the voice authentication system according to the present embodiment, a user can be authenticated by voice according to the above-mentioned procedure.

In the above-mentioned embodiment, it is recognized whether or not all the syllables configuring the entire registered keyword have been uttered completely by keyword utterance divided over a plurality of times. Thus, in the above-mentioned specific example, the keyword "KARAOKE" is divided into two portions "KARA" and "OKE". However, even by a method for dividing a keyword in which the syllables are arranged at random as in "KAO" and "RAKE", "KEKA" "ORA", and "RAKA" and "KEO", correct voice authentication can be performed.

In the present embodiment, syllables are not recognized even at a time of registration or authentication of a keyword. Therefore, in the case where a keyword contains at least two syllables of the same sound, these syllables cannot be discriminated from each other. Thus, it is preferable that, in the case where a plurality of syllables input by voice at a time of authentication exhibit high similarities relative to each other with respect to a plurality of registered speaker syllable models, they are processed by being recognized to be the same syllable.

For example, in the case where a keyword is "SUKIYAKI", at a time of registration of the keyword, the keyword registration part 21 allocates an index I1 to "SU (first syllable)", an index I2 to "KI (second syllable)", an index I3 to "YA (third syllable)", and an index I4 to "KI (fourth syllable)", and stores speaker syllable models in the registered speaker-specific syllable model database 20.

At a time of authentication, for example, it is assumed that the user has uttered "SU (syllable S1)" and "KI (syllable S2)" as the first divided keyword, and "YA (syllable S3)" and "KI (syllable S4)" as the second divided keyword. In this case, both the syllables S2 and S4 exhibit high similarities with respect to the speaker syllable models of the indexes I2 and I4. However, the similarity between the syllable S2 and the speaker syllable model of the index I2, the similarity between the syllable S4 and the speaker syllable model of the index I2, the similarity between the syllable S2 and the speaker syllable model of the index I4, and the similarity between the syllable S4 and the speaker syllable model of the index I4 have no substantial difference. Therefore, there is a possibility that an index having the highest similarity to the syllable S2 may be matched with an index having the highest similarity to the syllable S4. For example, in the case where both the syllables S2 and S4 are determined to be most similar to the index I2, it is determined that the syllable of the index I4 has not been uttered, whereby authentication is rejected.

Thus, in the case where a plurality of syllables exhibit similarities which are high relative to each other with respect to a plurality of speaker syllable models and which are remarkably higher than those with respect to the other speaker syllable models, an index having the highest similarity is not selected in Op15, and these plurality of syllables are considered to have the same sound and all the indexes of the speaker syllable models having high similarities to a plurality of syllables may be held in the similarity storage part 15. Alternatively, at a time of registration, whether or not a plurality of syllable utterances have high similarities relative to each other with respect to a plurality of speaker-specific syllable models, etc. is checked, whereby these plurality of syllables are confirmed to have the same sound, and information representing that the plurality of syllables have the same sound is stored, and if the same indexes are stored in the similarity storage part 15 as indexes of the speaker syllable models similar to these syllables, authentication may not be rejected even when all the indexes are not present.

Consequently, in the above example, even if "I1", "I2", "I3", and "I2", for example, are stored in the similarity storage part 15 as indexes of the similarity speaker syllable models with respect to the input syllables "SU", "KI", "YA", and "KI", it can be determined correctly that all the syllables of the keyword have been uttered.

The voice authentication system according to one embodiment of the present invention has been described. However, the above description is merely one specific example for carrying out the present invention, and can be changed variously within the scope of the invention.

For example, in the above embodiment, an example has been described in which a keyword is uttered under a condition of being divided into two portions at a time of authentication. However, the division number of the keyword may be any number without being limited to two. In the case where the division number of the keyword is at least three, the voice input of the divided keyword and the processings in Op13-Op15 in FIG. 3 corresponding to the input divided keywords may be repeated by the division number. Thus, even by the division such as "KA" and "RAOKE"; "OKERA" and "KA"; "RA", "KE"), and "OKA"; or "O", "RA", "KA", and "KE", correct voice authentication can be performed.

Furthermore, a user to be authenticated may be able to determine a division number arbitrarily. In this case, when the entire keyword has been uttered by a plurality of utterances of the divided keywords, the user is urged to press a particular button of a mobile telephone, for example, and when the voice authentication system detects that the button has been pressed in the input part 11, the voice authentication system may proceed to the processing in Op20 and the subsequent processings in FIG. 3. Alternatively, every time the utterance of a divided keyword is completed, the collection of the syllables that have been uttered is compared with the syllables configuring the entire registered keyword, and when it is determined that all the syllables configuring the entire keyword have been uttered, the process may proceed to the processing in Op20 and the subsequent processings in FIG. 3.

In the present embodiment, after the second divided keyword is input, the keyword checking part 17 checks the keyword and calculates an integrated similarity as an entire keyword in the similarity integration part 18, and the authentication determination part 19 determines whether to accept or reject authentication. However, at a time when the voice input of the first divided keyword is completed, the similarity integration part 18 may calculate an integrated similarity only from the syllables contained in the first divided keyword.

In this case, if the integrated similarity calculated from the first divided keyword is below a predetermined threshold value, the first divided keyword may be re-input by voice. Thus, for example, in the case where the similarity of the first divided keyword is low whereas the similarity of the second divided keyword is high, there is an advantage that the time and labor for re-inputting a voice from the beginning can be reduced.

In terms of the strict security, in the case where the similarity of the first divided keyword is low, the authentication determination part 19 may reject authentication without urging the user to input the second divided keyword.

Furthermore, in the case where the similarity of the second divided keyword is low after the input of the second divided keyword is completed, the second divided keyword may be re-input by voice under the condition that it is confirmed that all the syllables have been uttered by the keyword checking part 17. The reason for the above-mentioned conditioning is as follows. When the voice re-input of the second divided keyword is permitted in the case where it is not checked that all the syllables have been uttered, the attemps of the other keywords are permitted, which may enable a pretender to break through authentication.

In order to obtain stable authentication results, a method for calculating an integrated similarity as an entire keyword after all the voice inputs of the divided keywords are completed is more advantageous, compared with a method for obtaining a similarity for each divided keyword. The reason for this is as follows. A divided keyword has a short utterance length, so that a stable similarity is unlikely to be obtained. On the other hand, an integrated similarity as an entire keyword has a long utterance length, so that relatively stable similarity is obtained. Therefore, a threshold value in the case of determining with a similarity of the first divided keyword is set to be slightly mild.

Embodiment 2

Another embodiment of the voice authentication system according to the present invention will be described below. The configurations having the same functions as those of the configurations described in Embodiment 1 are denoted with the same reference numerals as those used therein, and the detailed description thereof will be omitted.

The voice authentication system according to the present embodiment is also suitable for voice authentication by a language in which a keyword is not always divided easily on a syllable basis like English, etc.

Figure 4:
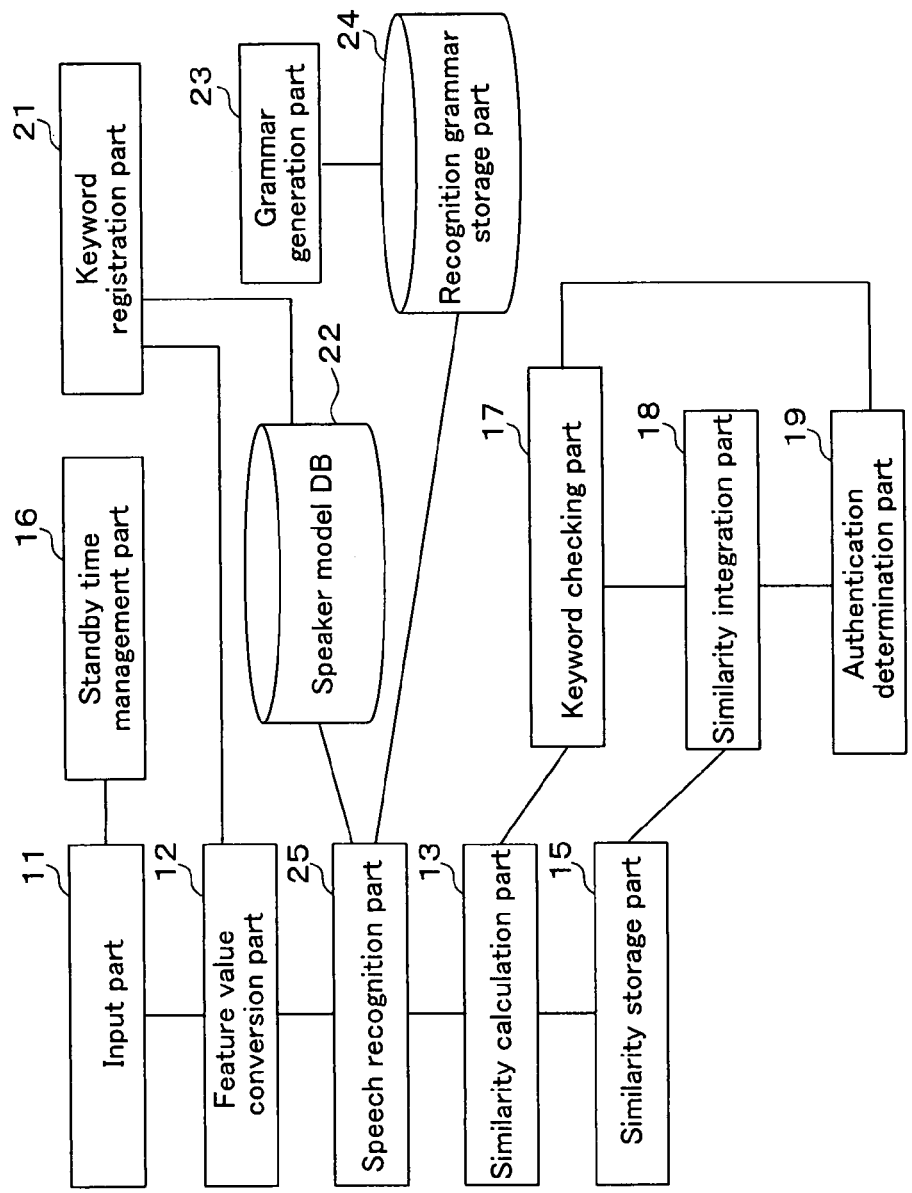
FIG. 4 is a block diagram showing a schematic configuration of a voice authentication system according to Embodiment 2 of the present invention.

Therefore, as shown in FIG. 4, the voice authentication system according to the present embodiment includes an input part 11, a feature value conversion part 12, a similarity calculation part 13, a similarity storage part 15, a standby time management part 16, a keyword checking part 17, a similarity integration part 18, an authentication determination part 19, a speaker model database 22, a keyword registration part 21, a grammar generation part 23, a recognition grammar storage part 24, and a speech recognition part 25.

Figure 5:
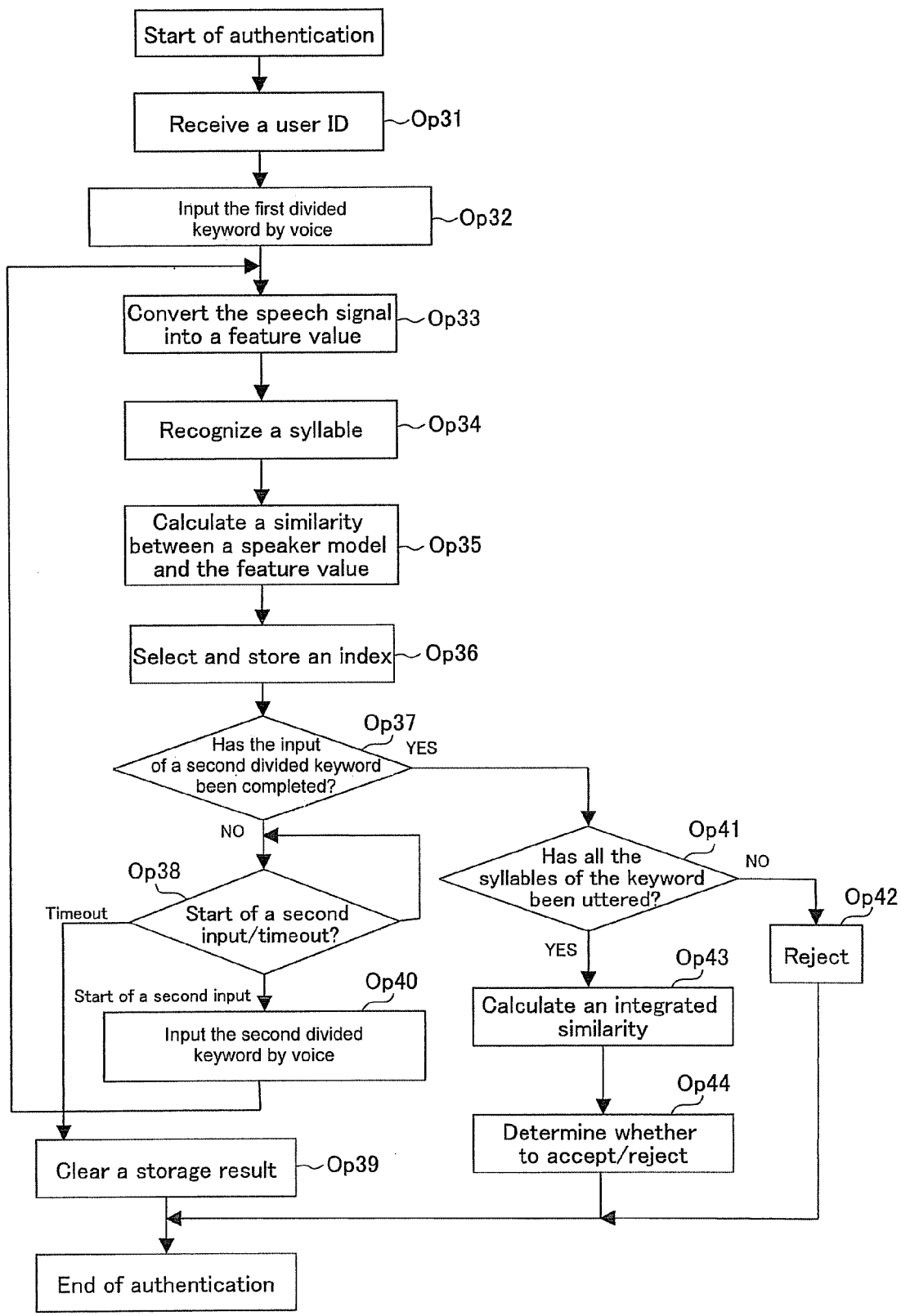
FIG. 5 is a flowchart showing an operation of the voice authentication system according to Embodiment 2 of the present invention.

Herein, a procedure of voice authentication in the voice authentication system of the present embodiment will be described with reference to FIG. 5.

First, a procedure for a user to register a keyword in a speaker model database 22 of the voice authentication system will be described. The user determines a desired keyword, and utters the keyword toward a microphone of a mobile telephone or the like connected to the input part 11. In the present embodiment, the grammar generation part 23 recognizes through a voice the keyword input by voice (speaker independent speech recognition), and registers a recognition grammar in the recognition grammar storage part 24 as a recognition result. Before registration, it is desirable to display the recognition result on a screen or the like and urge the user to check the content of the keyword registered by the user. It is also desirable to provide means (button, etc.) for correcting the recognition result.

It is difficult to perform single syllable recognition by speaker independent speech recognition in terms of accuracy. Therefore, it is desirable that the user inputs through a text the speech content of a keyword in the input part 11, using a keypad of a mobile telephone, for example, before registering the keyword. The input text (speech content of the keyword) and the uttered keyword voice are passed from the input part 11 to the grammar generation part 23.

The grammar generation part 23 generates a grammar for recognizing a pattern of keyword division capable of being input by the user, from the speech content input through a text. This grammar is not limited to a syllable base, and is generated so as to include all the patterns by the phoneme-based division. In the case of a language that is likely to be divided on a phoneme basis, such as Japanese, a grammar is generated so as to include all the patterns capable of being divided on a syllable basis. However, in the case of a language that is difficult to be divided on a syllable basis, such as English, a grammar is generated so as to cover all the patterns by phoneme-based division. For example, a grammar that accepts patterns such as "ve, veri, verify, tion, cation, fication, verifica" is generated with respect to the keyword "verification". The generated grammar is passed to the keyword registration part 21, and stored in the recognition grammar storage part 24.

The keyword registration part 21 creates speaker models (i.e., phoneme-based or syllable-based speaker models) adapted using a voice of a registered keyword, and registers the speaker models in the speaker model database 22 so that the speaker models are associated with a user ID of the user. As a method for creating a phoneme-based speaker model, there is a method for performing time association (called alignment) between a speech signal and a phoneme of a keyword by speaker independent speech recognition, performing adaptation for each phoneme configuring the entire keyword, and creating a speaker-specific phoneme model as a speaker model. Furthermore, as an adaptation method, any method for realizing speaker adaptation by model adaptation such as an MLLR (Maximum Likelihood Linear Regression) method or an MAP method may be used. In the case of creating a syllable-based speaker model, time association with a keyword is performed on a syllable basis, and then, speaker adaptation is performed.

A procedure will be described below, in which a user is authenticated by a voice input after the keyword registration is completed by the above procedure. Even in the following example, a case where a keyword is input by voice under a condition of being divided into two portions will be described, and the division number of the keyword is not limited to two.

First, the input part 11 receives a user ID or the like input by a user through a keypad of a mobile telephone (Op31). In the case where the number of users is limited to one as in a mobile telephone, the input procedure of the user ID is not necessary. Next, when the user utters the first divided keyword toward a microphone of the mobile telephone, the input part 11 receives the speech signal (Op32). In the present embodiment, the user may not input a voice by dividing the voice on a syllable basis. For example, in the case where a keyword is "KARAOKE", when the first divided keyword is set to be "KARA", "KARA" may be uttered in a stroke without putting a voiceless section between "KA" and "RA" unlike Embodiment 1.

Furthermore, regarding English or the like, there is a strong tendency that a speaker is not aware of a syllable strictly. Therefore, when a keyword is divided, there is a possibility that a syllable is missed by mistake or syllables overlap each other. The overlapping of syllables does not cause so serious problem for keyword authentication. Therefore, in the present embodiment, for example, in the case where a keyword is "verification", syllables are permitted to overlap each other in the divided keywords as in "verifi" and "fication".

The input divided keywords are converted into feature values used for speech recognition, such as the MFCC and the LPC cepstrum, in the feature value conversion part 12 (Op33). The feature values obtained in the feature value conversion part 12 are sent to the speech recognition part 25.

Next, the speech recognition part 25 refers to the recognition grammar stored in the recognition grammar storage part 24, and recognizes a syllable of a voice uttered as a divided keyword by speaker independent speech recognition (Op34). The recognition result is sent to the similarity calculation part 13. In the case where a recognition score is very poor, such as the case where a voice different from a keyword is uttered, it is better to determine "unrecognizable". In this case, the result of "unrecognizable" is sent to the similarity calculation part 13. In this example, although a voice is recognized by speaker independent speech recognition, the voice may be recognized using a speaker model adapted at a time of registration. In this case, the similarity calculated at a time of speech recognition is a similarity with respect to a speaker model, so that the similarity calculation in the similarity calculation part 13 is not required.

Next, the similarity calculation part 13 extracts a speaker model corresponding to the phoneme recognized in Op34 among the speaker models of the user from the speaker model database 22, based on the recognition result, and calculates a similarity of the feature value with respect to the extracted speaker model (Op35).

Based on the result in Op35, information (uttered phoneme data) representing which phoneme of the registered keyword is included in a syllable recognized from the uttered divided keyword is stored in the similarity storage part 15 (Op36). Along with this, a similarity of the recognized phoneme with respect to a speaker model is also stored in the similarity storage part 15.

Herein, since a second divided keyword has not been input (the result in Op37 is NO), the process proceeds to Op38.

The standby time management part 16 measures an elapsed time after the first divided keyword has been input in the input part 11 with a timer. Then, in the case where the input of the second divided keyword is not started within a predetermined time, a timeout is determined, the process proceeds to Op39, and the processing result of the first divided keyword is deleted from the similarity storage part 15 and the like (Op39). In this case, in order to be authenticated, the user must re-input the first divided keyword.

On the other hand, in the case where the input of the second divided keyword is started within the above-mentioned predetermined time, the standby time management part 16 stops and clears the timer, proceeds to Op40, accepts the input of the second divided keyword (Op40), and proceeds to Op33.

Then, the processings in Op33 to Op36 are performed with respect to the second divided keyword, and the keyword checking part 17 checks whether or not all the phonemes of the keyword have been uttered by the first and second utterances, based on the uttered phoneme data stored in the similarity storage part 15 (Op41). In the case where the determination result in Op41 is NO, the authentication determination part 19 is notified of the determination result, and the authentication determination part 19 rejects authentication of the user (Op42).

On the other hand, in the case where the determination result in Op41 is YES, the similarity integration part 18 calculates an integrated similarity representing to which degree the speech signal of uttered entire keyword is similar to the models of each registered keyword, based on the similarity on a divided keyword basis stored in the similarity storage part 15 (Op43). As the integrated similarity, a total of similarities of divided keywords may be used, or an average value of similarities of divided keywords may be used.

The integrated similarity obtained in the similarity integration part 18 is sent to the authentication determination part 19, and the authentication determination part 19 compares a predetermined threshold value with an integrated similarity. The authentication determination part 19 accepts authentication of the user if the integrated similarity exceeds a predetermined threshold value, and rejects if the integrated similarity is below the predetermined threshold value (Op44).

In the voice authentication system according to the present embodiment, a user can be authenticated by voice according to the above procedure. In the present embodiment, as described above, a plurality of syllables may be set to be minimum units of keyword division, or any unit other than a syllable such as a morpheme or a word may be set to be a minimum unit of keyword division, as long as it can be set to be an utterance unit.

Furthermore, in the case where a keyword is a numerical string (e.g., "1234"), the keyword may be checked or subjected to voice authentication, using a numeric as a unit (e.g., in the case of Japanese, "ICHI", "NI", "SAN", and SHI", or in the case of English, "one", "two", "three", and "four"). In this case, it is necessary to use a grammar for numeric recognition.

Similarly, in the case where the keyword is a mixture of numerics and alphabets (e.g., "1a2b"), it is necessary to use a grammar for recognizing numerics and alphabets.

Embodiment 3

Still another embodiment of the voice authentication system according to the present invention will be described below. The configurations having the same functions as those of the configurations described in Embodiment 1 or 2 are denoted with the same reference numerals as those used in these embodiments, and the detailed description thereof will be omitted.

The voice authentication system according to the present embodiment checks whether or not a user has moved to another place after the voice input of a previous divided keyword every time the second and subsequent divided keywords are input by voice, and does not receive a voice input in the case where the user has not moved to another place.

Figure 6:
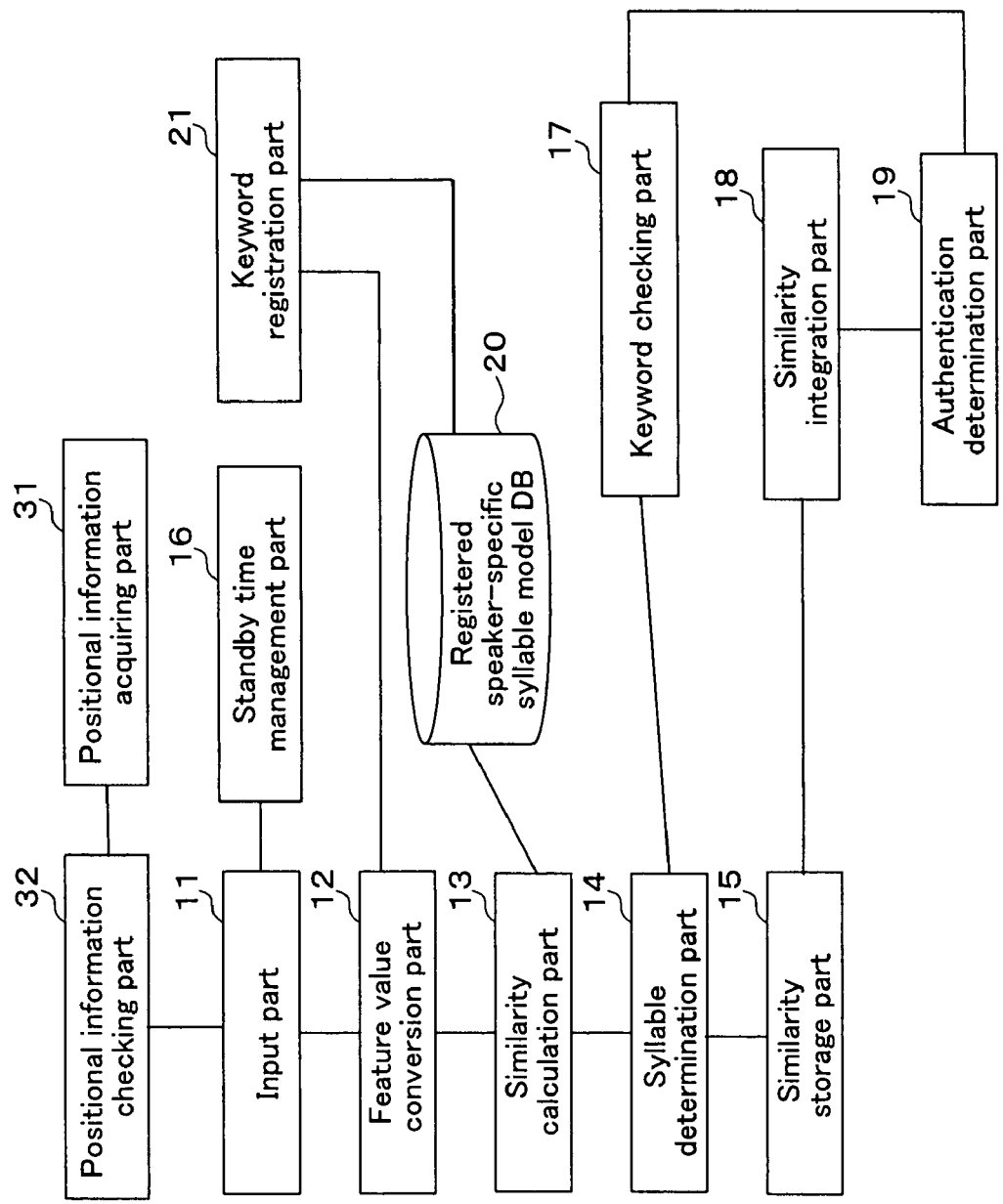
FIG. 6 is a block diagram showing a schematic configuration of a voice authentication system according to Embodiment 3 of the present invention.

Therefore, as shown in FIG. 6, the voice authentication system according to the present embodiment includes an input part 11, a feature value conversion part 12, a similarity calculation part 13, a syllable determination part 14, a similarity storage part 15, a standby time management part 16, a keyword checking part 17, a similarity integration part 18, an authentication determination part 19, a registered speaker-specific syllable model database 20, a keyword registration part 21, a positional information acquiring part 31, and a position checking part 32. More specifically, the voice authentication system according to the present embodiment further includes the positional information acquiring part 31 and the position checking part 32 in addition to the voice authentication system according to Embodiment 1.

The positional information acquiring part 31 acquires information that represents a current position of a user every time the user inputs a divided keyword by voice with a GPS (Global Positioning System) incorporated in a mobile telephone of the user, etc. The position checking part 32 checks whether or not the user has moved to another place after the voice input of the previous divided keyword based on the information acquired by the positional information acquiring part 31.

Figure 7:
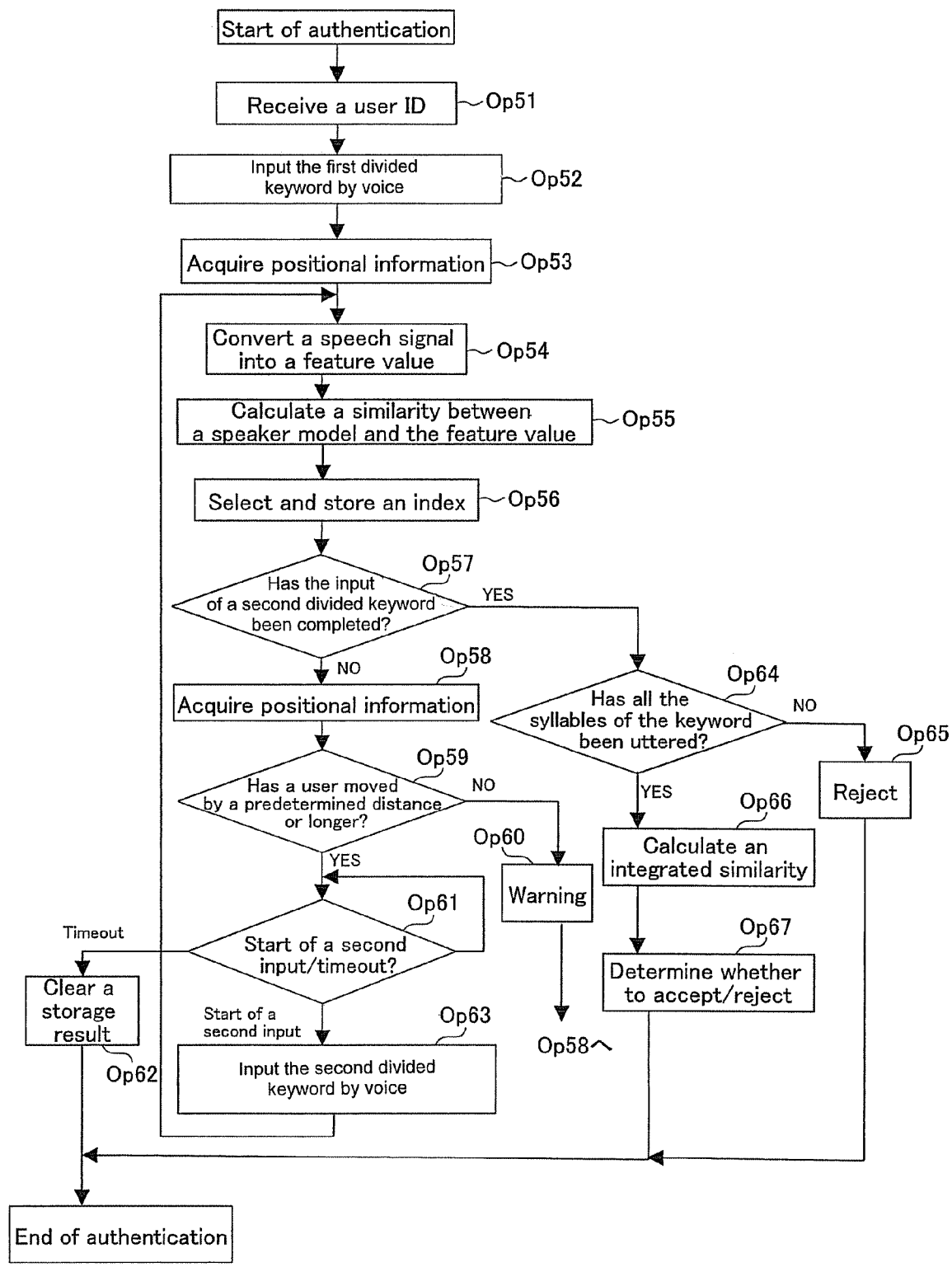
FIG. 7 is a flowchart showing an operation of the voice authentication system according to Embodiment 3 of the present invention.

An operation of the voice authentication system of the present embodiment according to the above configuration will be described with reference to FIG. 7.

First, the input part 11 receives a user ID or the like input by the user through a keypad of a mobile telephone (Op51). In the case where the number of users is limited to one as in a mobile telephone, the input procedure of the user ID is not required. Next, when the user utters the first divided keyword toward a microphone of the mobile telephone, the input part 11 receives the voice (Op52). At this time, simultaneously, the positional information acquiring part 31 acquires information that represents a current position of the user from the GPS incorporated in the mobile telephone of the user, and passes the acquired information to the position checking part 32 (Op53).

Each syllable of the input first divided keyword is converted into a feature value in the feature value conversion part 12 (Op54). The feature values obtained in the feature value conversion part 12 are sent to the similarity calculation part 13.

Next, the similarity calculation part 13 extracts speaker syllable models of the user stored so as to be associated with the user ID of the user from the registered speaker-specific syllable database 20, and calculates similarities of the feature values with respect to the extracted speaker syllable models (Op55). The obtained similarities are sent to the syllable determination part 14.

Next, the syllable determination part 14 selects an index of a model having the highest similarity among the speaker syllable models in the registered speaker-specific syllable model database 20, regarding each syllable of the first divided keyword, based on the similarities obtained in the similarity calculation part 13, and stores the index in the similarity storage part 15 together with the similarity (Op56). Herein, since the input of the second divided keyword has not been completed (the result in Op57 is NO), the process proceeds to Op58.

In order to exactly prevent the keyword from being revealed to a third party, it is preferable that, when the input of the first divided keyword is completed, a message instructing the user to move to another place before the voice input of the second divided keyword is displayed on the mobile telephone or the like of the user, or a voice message containing the similar content is sent to the mobile telephone.

Therefore, in Op58, when an appropriate time (for example, one minute) elapses after the voice input of the first divided keyword, the positional information acquiring part 31 acquires information that represents a current position of the user from the GPS incorporated in the mobile telephone of the user, and passes the acquired information to the position checking part 32.

The position checking part 32 compares the positional information at a time of input of the first divided keyword acquired in Op53 with the positional information acquired in Op58, thereby checking whether or not the user has moved to a place at a predetermined distance (e.g., 50 m) after the input of the first divided keyword (Op59). The predetermined distance is any distance without being limited to 50 m.

If the check result in Op59 is NO, the voice authentication system sends a voice message, which instructs the user to move to another place, to the mobile telephone of the user. Alternatively, a warning message that instructs the user to move to another place is displayed (Op 60).

On the other hand, if the check result in Op59 is YES, the processings after Op 61 are continued. The processings in Op 61 to Op 67 are similar to those in Op17 to Op23 described in Embodiment 1, so that the description thereof will be omitted.

As described above, the voice authentication system according to the present embodiment checks a current position of a user using the GPS or the like, and in the case where the user has not moved by the predetermined distance or longer after the previous input of the divided keyword, instructs the user to move by the predetermined distance or longer. This can exactly prevent a keyword from being revealed to a third party.

In the present embodiment, the configuration has been illustrated in which the voice authentication system according to Embodiment 1 further includes the positional information acquiring part 31 and the position checking part 32. However, the configuration in which the voice authentication system according to Embodiment 2 further includes the positional information acquiring part 31 and the position checking part 32 is also included in one embodiment of the present invention.

Embodiment 4

Still another embodiment of the voice authentication system according to the present invention will be described below. The configurations having the same functions as those of the configurations described in Embodiments 1 to 3 are denoted with the same reference numerals as those used in these embodiments, and the detailed description thereof will be omitted.

The voice authentication system according to the present embodiment has a configuration in which the system instructs the user how to divide a keyword or the like, and in the case where the user does not input a voice as instructed, authentication is rejected.

Figure 8:
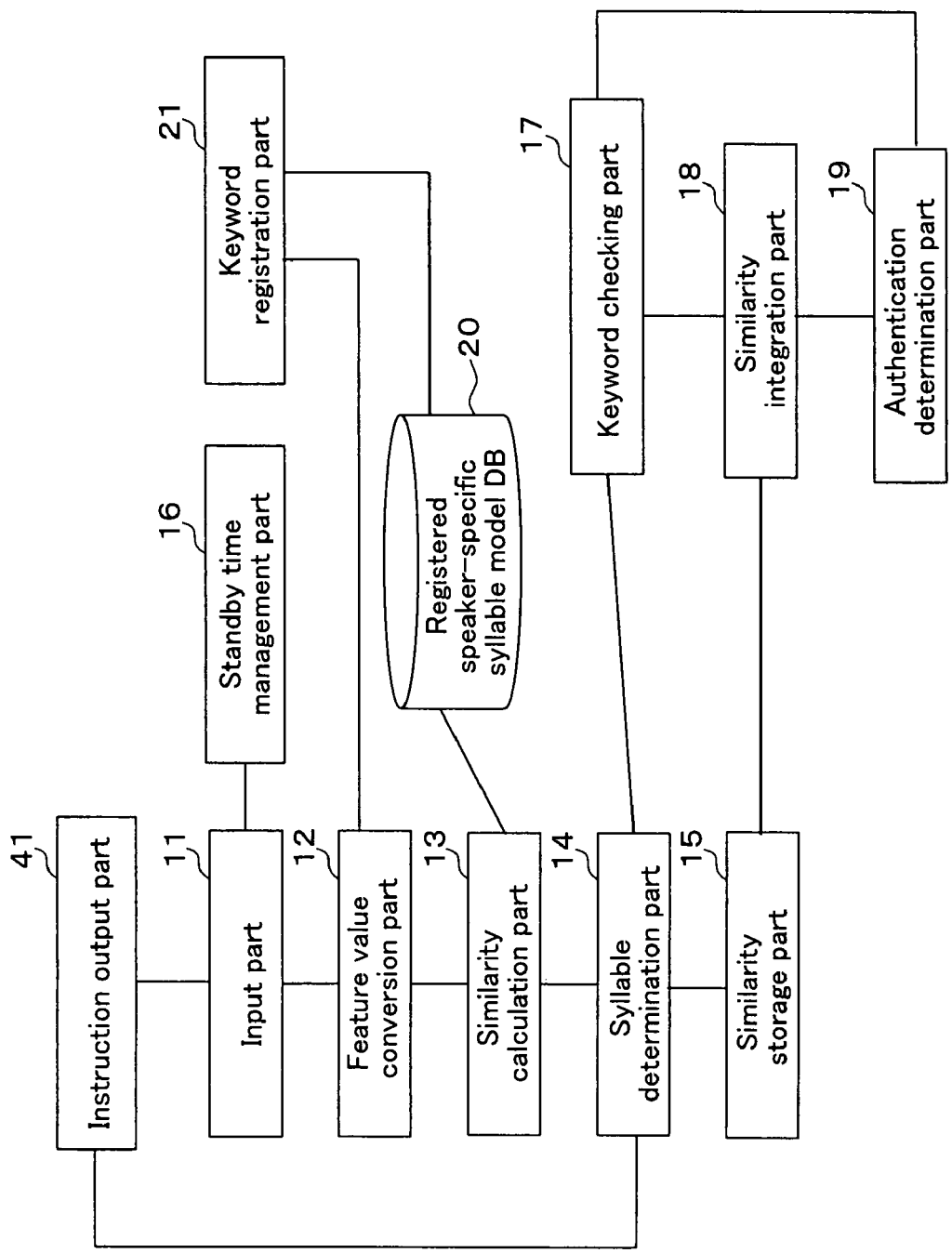
FIG. 8 is a block diagram showing a schematic configuration of a voice authentication system according to Embodiment 4 of the present invention.

Therefore, as shown in FIG. 8, the voice authentication system according to the present embodiment includes an input part 11, a feature value conversion part 12, a similarity calculation part 13, a syllable determination part 14, a similarity storage part 15, a standby time management part 16, a keyword checking part 17, a similarity integration part 18, an authentication determination part 19, a registered speaker-specific syllable model database 20, a keyword registration part 21, and an instruction output part 41. More specifically, the voice authentication system according to the present embodiment has a configuration in which the voice authentication system according to Embodiment 1 further includes the instruction output part 41.

The instruction output part 41 instructs the user to divide and input a keyword in accordance with a pattern selected at random from previously determined plurality of kinds of patterns.

As such an instruction, for example, the following instructions are considered: "Please input first three syllables as the first divided keyword and the remaining syllables as a second divided keyword", "Please set odd-numbered syllables as the first divided keyword, and even-numbered syllables as the second divided keyword", and "Please input a keyword by one syllable in a reverse direction". These instructions are shown merely for an illustrative purpose, and the content of an instruction is arbitrarily selected.

Hereinafter, an operation of the voice authentication system according to the present embodiment will be described with reference to FIG. 9. The registration procedure of a keyword by the user is similar to that in Embodiment 1, so that the description thereof will be omitted.

First, the input part 11 receives a user ID or the like input by the user through a keypad of a mobile telephone (Op71). In the case where the number of users is limited to one as in a mobile telephone, the input procedure of the user ID is not required. Next, the instruction output part 41 outputs, as a display or voice message, an instruction for urging the user to input the first divided keyword with respect to the mobile telephone of the user in accordance with the pattern selected at random from a previously determined plurality of kinds of patterns (Op72). The content of the instruction by the instruction output part 41 is also sent to the syllable determination part 14 for the processing in the syllable determination part 14 in Op76 described later.

For example, in the case where there is an instruction "please set odd-numbered syllables as the first divided keyword", assuming that a keyword is "KARAOKE", the user must input "KA", "O" as the first divided keyword, and input "RA", "KE" as the second divided keyword.

When the user utters the first divided keyword toward a microphone of a mobile telephone in accordance with the instruction, the input part 11 receives the voice (Op73).

The input syllables S1, S2 are converted into feature values in the feature value conversion part 12 (Op74). The feature values obtained in the feature value conversion part 12 are sent to the similarity calculation part 13.

Next, the similarity calculation part 13 extracts speaker syllable models of the user stored so as to be associated with a user ID of the user from the registered speaker-specific syllable model database 20, and calculates similarities of the feature values with respect to the extracted speaker syllable models (Op75). The obtained similarities are sent to the syllable determination part 14.

Next, the syllable determination part 14 selects an index of a model having the highest similarity among speaker syllable models stored in the registered speaker-specific syllable model database 20, regarding each syllable of the first divided keyword, based on the similarities obtained in the similarity calculation part 13, and stores the index in the similarity storage part 15 together with the similarity (Op76).

Furthermore, in Op76, the syllable determination part 14 determines whether or not each syllable of the first divided keyword has been uttered as instructed by the instruction output part 41. More specifically, in the above example, an instruction is given to the effect that odd-numbered syllables, i.e., "KA" that is the first syllable (index I1) of the keyword and "O" that is the third syllable (index I3) of the keyword are input as the first divided keyword. Thus, the first syllable of the first divided keyword needs to have the highest similarity to the speaker syllable model of the index I1, and the second syllable of the first divided keyword needs to have the highest similarity to the speaker syllable model of the index I3. If not, the syllable determination part 14 notifies the authentication determination part 19 of the determination result, and the authentication determination part 19 rejects authentication.

Figure 9:
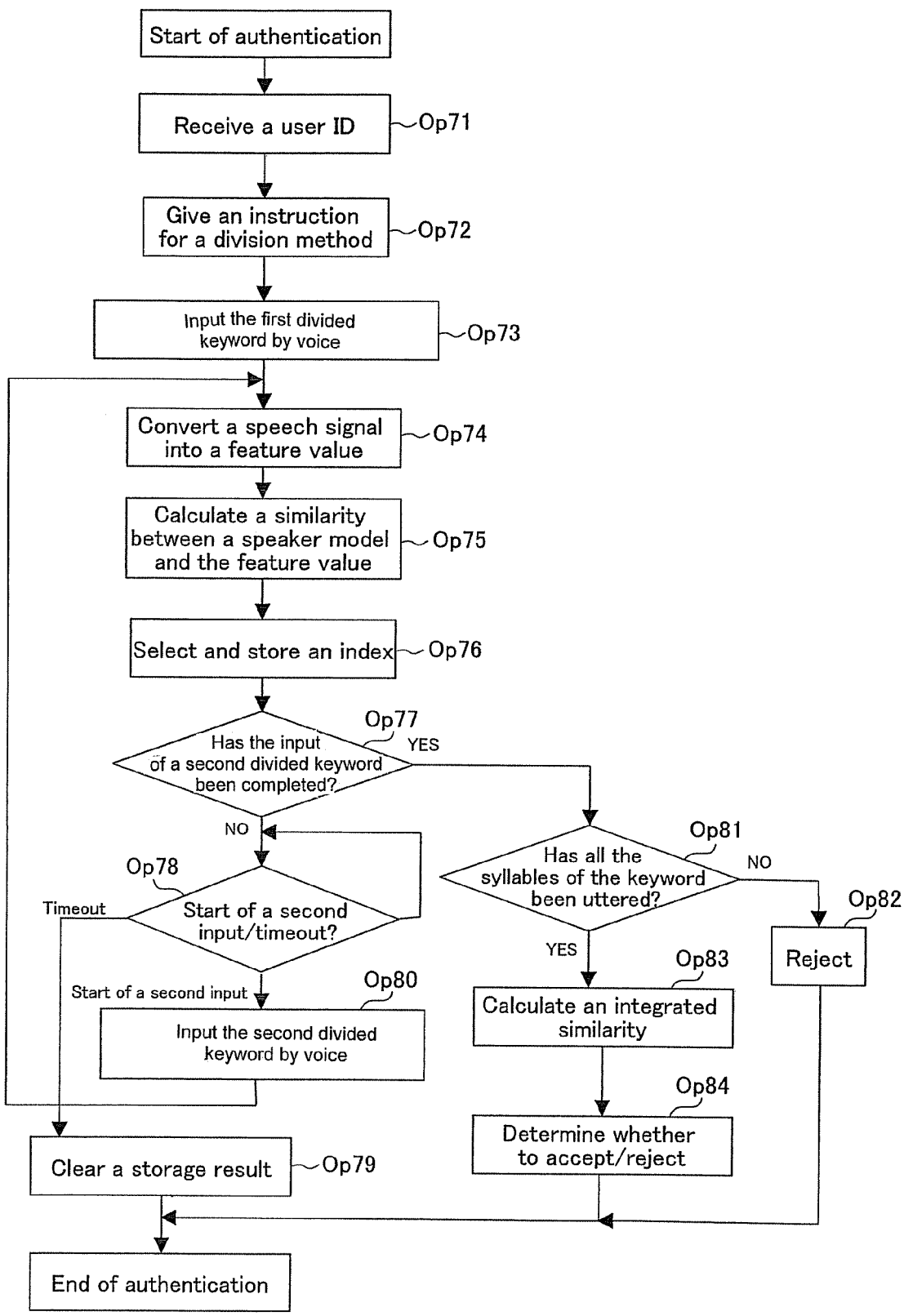
FIG. 9 is a flowchart showing an operation of the voice authentication system according to Embodiment 4 of the present invention.

In FIG. 9, the processing in Op77 and the subsequent processings are similar to those in Op16 to Op23 described in Embodiment 1, so that a repeated description will be omitted.

In the voice authentication system according to the present embodiment, as described above, the instruction output part 41 instructs the user how to divide a keyword so that the method for dividing a keyword is set at random for each authentication, thereby exactly preventing a keyword from being revealed.

In the above description, although the instruction output part 41 selects one method for dividing a keyword and instructs the user to use the method, the instruction output part 41 may present a plurality of patterns of dividing methods to the user so that the user selects a pattern from them.

In the present embodiment, the configuration in which the voice authentication system according to Embodiment 1 further includes the instruction output part 41 has been illustrated, the configuration in which the voice authentication system according to Embodiment 2 or 3 further includes the instruction output part 41 is also included in one embodiment of the present invention.

For example, in the case of the configuration in which the instruction output part 41 is added to the voice authentication system according to Embodiment 2, and a keyword is a numerical string, for example, the following instructions: "please input a second column number and a fourth column number as the first divided keyword, and input a first column number and a third column number as a second divided keyword", and "please input a personal identification number separately in a reverse direction" can be used. Furthermore, in the case where a keyword has a combination of numerics and alphabets, an instruction "please input odd-numbered numerics or alphabets as the first divided keyword, and input even-numbered numerics or alphabets as a second divided keyword" can be used.

As described in each embodiment, according to the present invention, a keyword is input under a condition of being divided, whereby the entire keyword is not heard by others. Thus, it is difficult for others to know the content of a keyword and to record the entire keyword continuously, which can prevent recording fraud.

Furthermore, according to the text-dependent voice authentication, the content of a keyword is likely to be revealed, and conventionally, a keyword needs to be changed frequently so as to maintain high performance, which entails a large cost for management. However, according to the present invention, the content of a keyword is unlikely to be revealed, and it is not necessary to change a keyword frequently, which can reduce a cost for changing a keyword.

Furthermore, for example, if the first divided keyword is input by voice in an empty place, and only a second divided keyword is input by voice in front of the public such as a cash desk, an authentication time can be shortened in front of the public, and payment can be performed speedily.

In the voice authentication system according to each of the above embodiments, a user may select whether to divide and input a keyword so that voice authentication can be performed without dividing a keyword in a place where others are not present in the surrounding, for example.

INDUSTRIAL APPLICABILITY

The present invention is useful as a text-dependent voice authentication system capable of maintaining high authentication accuracy, using the confidentiality of a keyword, by preventing the leakage of a keyword and the recording fraud.

The invention claimed is:

1. A text-dependent voice authentication system that performs authentication by receiving a keyword which a user inputs by voice, comprising:
   an input part that receives a voice input of a keyword from the user, said keyword is divided into a plurality of portions with an utterable unit which is a minimum unit, said voice input is carried out over a plurality of times at a time interval for each of the portions;
   a speaker model storage part that previously stores a registered keyword of the user as a speaker model created in the utterable unit;
   a feature value conversion part that obtains a feature value of a voice from a portion of the keyword which is received by each voice input in the input part;
   a similarity calculation part that obtains a similarity between the feature value obtained in the feature value conversion part and the speaker model;
   a speech content determination part that determines information on a speech content by the plurality of times of voice inputs, based on the similarity obtained in the similarity calculation part;
   a keyword checking part that determines whether or not the speech content of the plurality of times of voice inputs is capable of configuring an entire registered keyword, based on the information on the speech content determined in the speech content determination part; and
   an authentication determination part that determines whether to accept or reject authentication, based on a determination result in the keyword checking part and the similarity obtained in the similarity calculation part.

2. The voice authentication system according to claim 1, wherein the utterable unit is a syllable.

3. The voice authentication system according to claim 2, wherein in the speaker model storage part, a discrete index in the speaker model storage part is provided to each speaker model corresponding to each syllable configuring the registered keyword,
   the feature value conversion part obtains each feature value for each syllable from each portion of the keyword received by each voice input,
   the similarity calculation part obtains each similarity between each feature value for each syllable and the speaker model corresponding to each syllable,
   the system further comprises a syllable determination part that determines to which syllable of the registered keyword any of the portions of the keyword received by the voice inputs is the most similar, based on the similarity obtained in the similarity calculation part, and
   the keyword checking part determines whether or not the syllables determined by the plurality of times of voice inputs are capable of configuring the entire registered keyword, based on a determination result of the syllable determination part.

4. The voice authentication system according to claim 1, wherein the utterable unit is a reading of a numeric or a reading of an alphabet.

5. The voice authentication system according to claim 1, further comprising a speech recognition part that recognizes a syllable or phoneme of the portion of the keyword using a speaker independent speech recognition method, from the feature value obtained in the feature value conversion part,
   wherein the keyword confirmation part determines whether or not it is possible to configure the entire registered keyword using a result of speech recognition by the plurality of times of voice inputs in the speech recognition part.

6. The voice authentication system according to claim 1, wherein the authentication determination part rejects authentication in a case where both there is no voice input of a subsequent portion even after an elapse of a predetermined time from a completion of the voice input of the portion of the keyword and it is not possible to configure the entire registered keyword, using information on the speech content of the voice inputs up to that time.

7. The voice authentication system according to claim 1, further comprising:
   a positional information acquiring part that acquires location information of the user every time the portion of the keyword is input by voice; and
   a position checking part that compares location information acquired in the positional information acquiring part at a time of a previous voice input with location information acquired in the positional information acquiring part at a time of a current voice input and checks whether or not the user has moved by a predetermined distance or longer from the previous voice input to the current voice input using a result of the comparison.

8. The voice authentication system according to claim 1, further comprising a similarity integration part that obtains an integrated similarity by integrating similarities obtained in the similarity calculation part, regarding all the portions of the keyword received by the plurality of times of voice inputs, wherein the authentication determination part determines whether to accept or reject authentication on the basis of the integrated similarity obtained in the similarity integration part.

9. The voice authentication system according to claim 1, wherein the input part receives a voice input through a mobile terminal of the user.

10. A computer program product stored on a computer-readable medium, for causing a computer to embody a text-dependent voice authentication system that performs authentication by receiving a keyword which a user to input a keyword by voice, said computer program comprising the operations of:

an input operation of receiving a voice input of a keyword from the user, said keyword is divided into a plurality of portions with an utterable unit which is a minimum unit, said voice input is carried out over a plurality of times at a time interval for each of the portions;

a feature value conversion operation of obtaining a feature value of from a portion of the keyword which is received by each voice input in the input part, said feature value of a voice is a speech signal contained in the portion of the keyword;

a similarity calculation operation of referring to a speaker model storage part in which a keyword of a user is previously registered as a speaker model created in the utterable unit, and obtaining a similarity between the feature value obtained in the feature value conversion operation and the speaker model;

a speech content determination operation of determining information on a speech content by the plurality of times of voice inputs, based on the similarity obtained in the similarity calculation part;

a keyword checking operation of determining whether or not the speech content of the plurality of times of voice inputs is capable of configuring an entire registered keyword, based on the information on the speech content determined in the speech content determination operation; and an authentication determination operation of determining whether to accept or reject authentication, based on a determination result by the keyword checking operation and the similarity obtained by the similarity calculation operation.

* * * * *